July 29, 1969  M. MASEL ET AL  3,458,720
TRIP-FLOP STEPPER MOTOR DRIVER
Filed June 15, 1966

INVENTOR.
MARVIN MASEL
ROBERT S. PRILL
BY
Karl A. Ohralik
ATTORNEY

United States Patent Office 3,458,720
Patented July 29, 1969

3,458,720
TRIP-FLOP STEPPER MOTOR DRIVER
Marvin Masel, West Englewood, and Robert S. Prill, Bloomfield, N.J., assignors to Singer-General Precision, Inc., Little Falls, N.J., a corporation of Delaware
Filed June 15, 1966, Ser. No. 557,758
Int. Cl. H03k *17/02*
U.S. Cl. 307—223                                          1 Claim

ABSTRACT OF THE DISCLOSURE

A drive circuit for stepper motors with three phases using first, second and third NPN transistors in a sequence where two transistors are always on and one is off. The drive is through the collector, the input through the base. Each base through a resistor is connected to the collector of two other transistors. The control is through pairs of back to back diodes connected at the anodes which in turn are connected to the bases. Each collector is connected to two diode cathodes in a different diode pair. To input lines are used one in series with one cathode in each pair, the other in series with the other cathode in each pair, and switch means can connect each input line to a source of potential.

---

Figure 1:
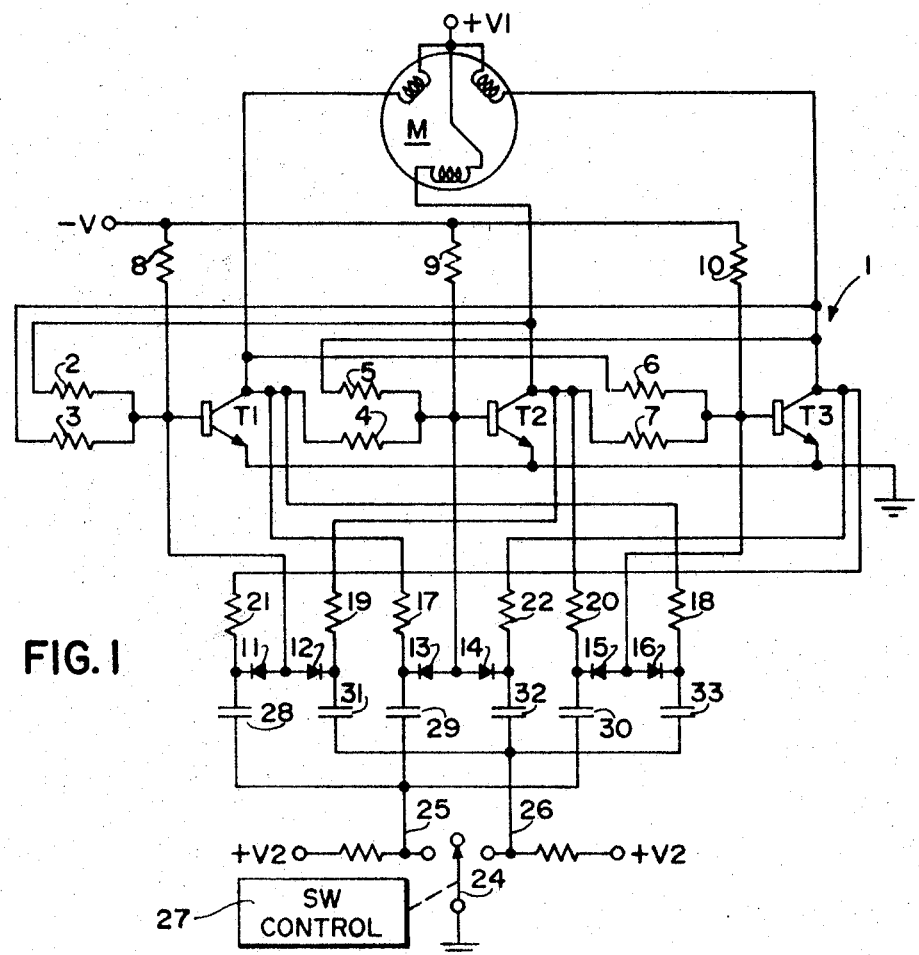

This invention relates to an electrical circuit and more particularly to a circuit for control of apparatus which is responsive to an orderly, sequential application of electrical pulses for proper operation.

In certain types of apparatus, such as the slow speed motor described and claimed in the patent application of Charles P. O'Regan for Slow Speed Motor, Ser. No. 456,170, filed Mar. 29, 1965, or the motor described and claimed in patent application of Charles P. O'Regan for Variable Reluctance Stepper Motor Damper, Ser. No. 443,278, filed Mar. 29, 1965, both assigned to the present assignee, electrical potential pulses, applied on different ones or pairs, as the case may be, of a plurality of apparatus input lines, are required for operation. The pulses must be simultaneously presented to one or pairs of the respective lines in a certain order to provide a certain result, such as rotation of the motor in a forward direction. A different order of presentation of the pulses simultaneously to one or a pair of input lines produces a different effect, such as a reverse rotation of the motor.

While this invention is concerned with control circuitry for producing control and energization pulses on either one or more than one input of an apparatus, for brevity, clarity and simplicity of explanation, the invention will be set forth and described with respect to that embodiment of control circuit sequentially producing different pairs of pulses. It should be understood however, that the invention may readily be modified and adapted to provide only single control and energization pulses in sequence without departing from the spirit and scope thereof.

Control circuitry for producing the desired orderly presentation of electrical pulses as herein described, has been heretofore known. However, such circuitry is objectionable as being complex, requiring a large number of circuit elements and as being undesirably large and heavy. The complexity of the circuitry tends to lessen its reliability and the space weight considerations of such circuitry also become particularly disadvantageous in its use as a component in a space vehicle. In addition to disadvantages of the circuit itself, the electrical power requirements of a complex circuit are greater, adding further to the weight and cost of the circuit.

Accordingly, it is a principal object of this invention to facilitate the presentation of combinations of electrical control and energization pulses to pairs of a plurality of lines, in any selected one of a plurality of predetermined orderly sequences, and utilizing simple, light and inexpensive circuitry.

It is another object of this invention to facilitate effective control of an apparatus requiring energization by a plurality of separate, sequential, orderly presented pairs of electrical impulses and enabling such order of presentation to be readily changed.

It is another object of this invention to effect both energization and control of an electrical apparatus by circuitry having active circuit elements essentially performing both such functions.

Pursuant to the foregoing objects and in accordance with this invention, a multistable circuit of the multivibrator type and having as many stages and states of equilibrium as there are input lines of the motor or other apparatus requiring a sequence of one or a pair of electrical pulses for proper operation, is provided. In this circuit, active circuit elements which are preferably transistors, each with control electrode and output electrode, but which may be electron tubes of the triode or other suitable type in cases where size and weight are not important factors, have their control electrodes coupled to the output electrodes of each of the other active circuit elements. The coupling elements are so proportioned that the circuit, in response to electrical energization, is capable of assuming any one of the states of equilibrium.

In each state of equilibrium, one of the active circuit elements is in a unique condition of conduction and the other active circuit elements are in a different condition of conduction presenting an energizing condition for the apparatus controlled. It should be understood that the expression "condition of conduction" as used in this description and the claims, contemplates both a condition of zero or no current conduction as well as a value of current conduction greater than zero. Provision for coupling input pulses of a predetermined polarity, simultaneously to the control electrodes of all of the active circuit elements, and using output electrode potentials for conditioning gating elements through which the input pulses pass, causes a different active circuit element to assume the unique condition of conduction and the others, including the previously uniquely conducting active circuit element, to assume the different condition of conduction. Thus, with the output electrodes of the active circuit elements connected to the inputs of the motor or other apparatus controlled, the series of input pulses to the control circuit result in rotation of the motor or activation of other apparatus utilized.

Figure 2:
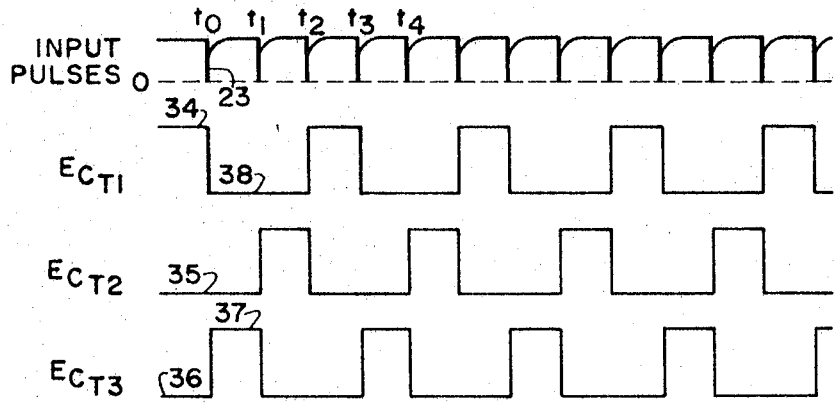

Other objects and advantages of this invention will be apparent from the following detailed description considered with the accompanying drawings in which:

FIGURE 1 is a schematic representation of one embodiment of the control circuit of this invention, as applied in a motor control function; and FIGURE 2 is a timing diagram showing the relationship between input pulses and the potentials appearing at transistor collectors in the control circuit.

Referring now to the drawings for a detailed description of the invention, 1 represents generally the control circuit of this invention and M represents the motor to which the circuit 1 is providing operating power under control. The motor M is of the type shown in the abovementioned patent application, Ser. No. 443,278, and has three stator windings requiring sequential energization of pairs of windings for proper operation. Such energization produces rotation of a rotor, not shown herein.

The circuit 1 includes three active circuit elements being transistors T1, T2, and T3, each of the NPN type. Each transistor includes a collector electrode forming the output electrode in the present circumstances and a base electrode forming the input electrode herein. Each also includes an emitter electrode connected to ground.

The electrodes of the transistors are cross coupled to form a multistable circuit. Thus, the base of transistor T1 is connected through resistors 2 and 3, respectively, to collectors of transistors T2 and T3. Similarly, the base of transistor T2 is connected through respective resistors 4 and 5 to collectors of T1 and T3 and base of T3 is connected through respective resistors 6 and 7 to collectors of T1 and T2. Accordingly, the potentials appearing at the transistor collectors are applied through the resistors to the respective transistor bases. A base biasing potential herein represented by —V, is applied to the transistor bases through respective resistors 8, 9 and 10. A positive energizing potential represented by +V1 is applied to the transistor collector electrodes through respective ones of the motor windings.

The circuit as thus far set forth, comprises a multistable circuit having three states of equilibrium in each of which states, one of the transistors is cut off and the other two are conducting relatively heavily. For purposes of explanation, it is assumed that T1 is cut off and transistors T2 and T3 are conducting. In this condition, the collector of T1 is at a relatively high positive potential and the collectors of T2 and T3 are slightly positive but near ground or zero potential. The base potentials are affected by the bias potential —V, and the potential of the collector to which the base is resistively connected. Thus, since the collector of T1 is near +V1, the bases of transistors T2 and T3, which are resistively connected to this collector are maintained at a slight positive potential, rendering these transistors conducting. The collectors of T2 and T3 are at low positive potentials and thus, the potential at the bases of T1 and T3 to which these collectors are resistively connected, are influenced by other factors. The base of T2 is maintained slightly positive in the manner already described. The base of T1, however, is held at a negative potential, below cutoff, by the base biasing potential —V.

From the foregoing, it is seen that the circuit in the condition described is receptive to negative pulses simultaneously applied to the bases of the transistors to change the state of equilibrium of the circuit.

For achieving a predetermined order in the change of states of equilibrium of circuit 1, the potentials at respective transistor collectors are combined with potentials of incoming pulses and applied respectively to the transistor bases in a certain order. The order of the changes of equilibrium may be made different by applying the combined potentials in a different order to the respective bases.

The collector potentials and incoming pulses are combinable in circuitry including three pairs of unidirectional devices, preferably pairs of diodes 11, 12; 13, 14; and 15, 16. The anodes of the respective pairs are interconnected and connected to the bases of respective transistors T1, T2 and T3. For applying transistor collector potentials to the diode cathodes, these collectors are connected as follows: collector of transistor T1 is connected through respective resistors 17 and 18 to cathodes of diodes 13 and 16, collector of transistor T2 is connected through respective resistors 19 and 20 to the cathodes of diodes 12 and 15 and the collector of transistor T3 is connected through respective resistors 21 and 22 to the cathodes of diodes 11 and 14.

For deriving input pulses as shown at 23 in FIGURE 2 of the drawings, a switch 24 is operable to repetitively connect either of two input lines 25 and 26, to ground. This switch is actuable by a suitable switching apparatus 27. The switch 24 and the coupling to the switching apparatus 27 are both preferably electronic in nature and are shown as they are for purposes of simplicity and brevity in explanation.

Input line 25 is connected to a source of positive potential +V2, through a resistor 25A and through respective capacitors 28, 29 and 30 to the cathodes of respective diodes 11, 13 and 15. Similarly, input line 26 is connected through a resistor 26A to positive potential source +V2, and through respective capacitors 31, 32 and 33 to the cathodes of diodes 12, 14 and 16.

Accordingly, in the neutral position of switch 24 as shown, that is, not connected to either line 25 or 26, the capacitors 28 through 35, each have the potential +V2 applied to one plate thereof. As the switch 24 is actuated, so as to ground an input line, the potential of these plates quickly drops to zero and in effect, a negative pulse is applied through the capacitors to the cathodes of the diodes to which the capacitors are also connected.

Accordingly, the input pulses may be selectively applied to either set of three diode cathodes to be combined with the potentials appearing at these cathodes by reason of the resistive connection to respective transistor collectors. If the input pulse is of greater magnitude than a positive potential that may be present at the diode cathode, such a negative pulse will be applied through the diode to the transistor base which is connected to the anode of the subject diode.

One of the lines 25 and 26 may be regarded as a forward line and the other as a reverse line and similarly, one of the corresponding diode sets 11, 13, and 15 and 12, 14, and 16 may be regarded as a forward set and the other as a reverse set because input pulses applied to these lines and diode sets result in opposite influences on motor M. That is, pulses applied to one line and a corresponding set of diodes causes motor rotation in one direction and pulses applied to the other line and corresponding diode set causes motor rotation in the reverse direction.

For a better understanding of the operation of the circuit 1, it is assumed that appropriate energizing potentials —V and +V1 are applied, and that switch 24 is actuated to apply pulses to input line 25.

Upon the application of the energizing potentials, the circuit 1 will assume a state of equilibrium with one of the transistors cut off and the others conducting. For convenience in explanation, it is assumed that transistor T1 is the uniquely cut off transistor. In this condition of the circuit the collector of T1 is at a relatively high positive potential near +V1. Consequently, a positive, biasing potential is impressed upon the bases of transistors T2 and T3 through respective resistors 4 and 6 providing base to emitter current holding these transistors on and the potential of collector of T1 is applied to the cathode of diode 16, however, for the purposes of the present explanation, with switch 24 being actuated to sequentially ground line 25, the circuitry involving diodes 12, 14 and 16 may be disregarded since it will be of no effect.

Also, in this condition of the circuit 1, the collectors of transistors T2 and T3 are at low potentials, near ground, and these potentials are impressed upon the cathodes of diodes 15 and 11, respectively. This condition of the circuit 1 is represented in FIGURE 2 at time $t_0$. As shown at 34, the potential at collector of T1 is high and as shown at 35 and 36, the potentials at collectors of T2 and T3 are low.

The magnitude of potential +V1 is greater than the magnitude of pulses 23. Thus, a time $t_1$, a negative input pulse 23 applied through capacitors 28, 29 and 30, simultaneously to the cathodes of diodes 11, 13 and 15 will be insufficient to overcome the positive potential appearing on the cathode of diode 13 whereby no pulse is transferred to base of T2. The negative pulse 23 applied to the cathode of diode 11 overcomes the positive potential at this point, and a negative pulse is applied to the base of T1. Since this transistor is ealready cut off and the effect of a negative pulse to an NPN type transistor base is to lessen conduction in the transistor, this pulse is of no direct effect on transistor T1. The most significant application of the negative pulses is to the cathode of diode 15 through which it passes to base of T3 since the magnitude of this pulse exceeds the positive potential appearing at the cathode of diode 15. The pulse so applied causes transistor T3 to become cut off, raising its collector potential to a relatively high positive value as shown at 37 in FIGURE 2. This potential is applied through resistor 3 to the base of transistor T1, increasing its potential sufficiently to produce conduction therein. The collector potential of T1 then drops as shown at 38 in FIGURE 2. Since transistor T2 is already conducting, the potential at collector of T3 applied through resistor 5 to the base of T2 is effective only to maintain conduction therein during the oncoming pulse interval and its collector potential remains low as shown in FIGURE 2.

It is thus seen that the effect of pulse 23 at time $t_1$ is to change the condition of circuit 1 from transistor T1 uniquely cut off to the condition of transistor T3 uniquely cut off. In an entirely similar manner, in response to pulse 23 at time $t_2$, transistor T2 becomes uniquely cut off and in response to further pulses, the repetitive order of the uniquely cut off transistor is T1, T3, T2, T1, T3, T2, T1 . . . .

With switch 27 actuated to sequentially ground input line 26, action similar to that described hereinabove occurs, with the repetitive order of cut off transistor being T1, T2, T3, T1, T2, T3 . . . , in response to the successive incoming pulses 23.

As an important feature of this invention, the windings of motor M are energized in different successive pairs as the circuit 1 changes states of equilibrium. With transistor T1 uniquely cut off, two windings of the motor M are energized by series current paths from +V1, through the appropriate windings and through the respective conducting transistors T2 and T3 to ground. With transistor T3 uniquely cut off, a different pair of the three motor windings which are in series with transistors T1 and T2 are energized. In this manner, in response to the input pulses 23, the circuit 1 changes states of equilibrium and with each change produces energization of a different pair of motor windings, producing in turn, rotation of the motor in one direction. Reverse rotation of the motor is achieved by applying input pulses 23 the different set of capacitors, changing the order of successive states of equilibrium of circuit 1 and resulting in a different order of energization of motor windings.

From the foregoing description it is clear that a novel control circuit has been provided for controlling an apparatus which requires pulses, simultaneously applied to different pairs of inputs thereof. The improved circuit described herein is simple, requiring only three active circuit elements and relatively few passive circuit components, all of which are light, durable and reliable. Furthermore, the circuit components are inexpensive and the entire circuit easily and readily wired.

While the invention has been set forth and described with respect to a specific embodiment thereof, it is to be understood that numerous changes, modifications and alterations may be made without departing from the spirit and scope thereof. It is therefore intended to encompass all such changes, modifications and alterations in the accompanying claim.

What is claimed is:

1. A drive circuit for a stepper motor with three phase comprising in combination:
   (a) first, second and third NPN transistors respectively having first, second and third emitters, collectors and bases, said emitters being connected to ground, said collectors forming the output electrode to each of said phases and said bases forming the input electrode for the respective transistor;
   (b) resistors in series with each of said bases and a connection through the resistor of said first base to said second and third collectors, said second and third bases being each likewise connected to the first and third and the first and second collectors respectively so that the potentials appearing at the collectors are applied through the resistors to the respective bases, the circuit thus having three states of equilibrium, in each of which states, one of the transistors is cut off and the other two are conducting;
   (c) first, second and third pairs of unidirectional devices with anodes and cathodes, the anode of the respective pairs being interconnected and connected to the corresponding first, second and third bases, the first collector being connected to the cathode of one device each, of the second and third pairs, the second and third collectors each being likewise connected to the cathode of one device each, of the first and third and the first and second pairs respectively;
   (d) capacitors in series with each of said cathodes;
   (e) a first input line including a power source lead and a resistor in series with one of the cathodes and capacitor in each of said pairs connected to a different collector, a second input line including a power source lead and a resistor in series with the other of the cathodes and capacitor in each of said pairs; and,
   (f) switch means to provide pulses to each of said input lines.

References Cited
UNITED STATES PATENTS

| 2,876,365 | 1959 | Slusser | 307—223 |
| 3,125,692 | 1964 | Fennick et al. | 307—223 |
| 3,210,569 | 1965 | Reek | 307—223 |
| 3,247,433 | 4/1966 | Lasch et al. | 307—223 |

ARTHUR GAUSS, Primary Examiner

H. A. DIXON, Assistant Examiner

U.S. Cl. X.R.
318—138, 537